May 16, 1933.  J. A. BOWER  1,909,652
GLAZING THICKNESS GAUGE
Filed June 1, 1931
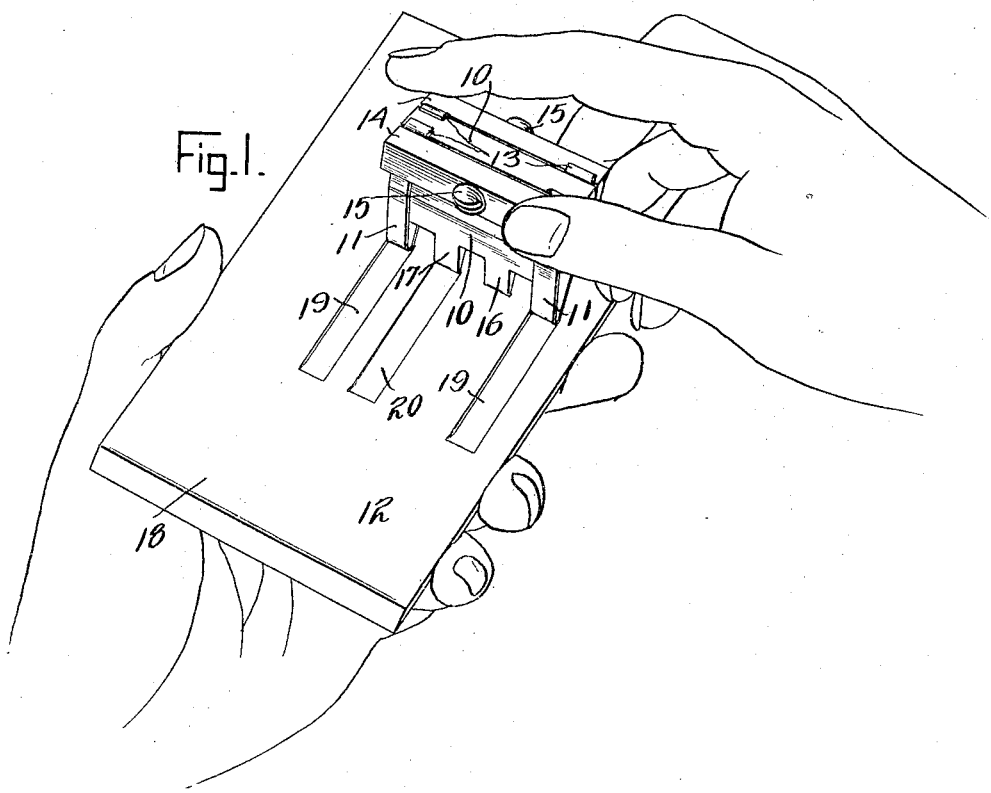
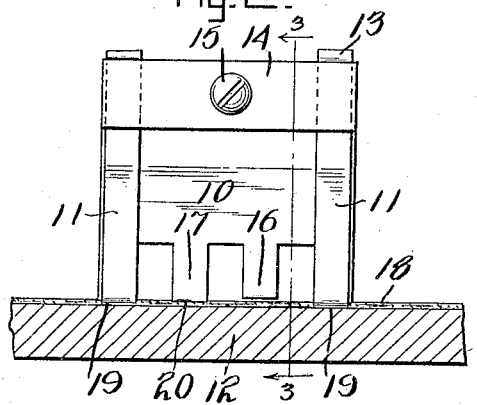
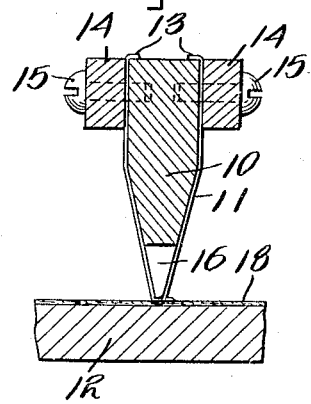
Inventor
James A. Bower
By
Attorney Patented May 16, 1933

1,909,652

UNITED STATES PATENT OFFICE

JAMES ARTHUR BOWER, OF ANDERSON, INDIANA, ASSIGNOR TO THE NATIONAL TILE COMPANY, OF ANDERSON, INDIANA, A CORPORATION OF OHIO

GLAZING THICKNESS GAUGE

Application filed June 1, 1931. Serial No. 541,498.

This invention relates to gauges for gauging the thickness of the film on any flat surface and is particularly adapted for measuring the thickness of glazing on tile.

An object of the invention is to provide a gauge for this purpose in which parts which easily wear may be quickly replaced to keep the gauge within predetermined ranges of accuracy.

A further general object is to provide a gauge for the purpose indicated which will be accurate, simple in structure and which may be manufactured at a very small cost.

Referring to the accompanying drawing, which is made a part hereof and on which similar reference characters indicate similar parts, Figure 1 is a perspective view of the invention and the manner in which it is used, Figure 2, a view in elevation showing it in position on a tile, the tile being shown in section, and Figure 3, a section on line 3—3 of Figure 2.

The gauging device consists of a block 10 having four depending integral fingers, the end ones forming supports which rest upon the face of tile 12 when in operation. The supports are faced with very thin steel wear-strips 11 and their upper ends are bent over as at 13 to engage the upper face of the block 10 and are held on the block by means of bars 14 which are secured to the block by screws 15. The block 10 has depending portions 16 and 17. The end of the portion 17 is short of the ends of the legs 11 by a distance equal to the thickness of the film or glazing 18 which is placed upon the tile. The leg 16 is slightly shorter than the leg 17, the difference in distance in the length of the legs 16 and 17 will be the amount of variation permitted in the thickness of the glazing, for example, the glazing on the tile may be approximately .007 of an inch thick in which case the distance in the length of the supports and the portion 17 will be approximately .007 of an inch and the difference in the length of the supports and the portion 16 will be approximately .009 of an inch.

In operation the gauge is held in the hand as shown in Figure 1 and a tile 12 which is selected at random is held in the left hand as shown. The gauge is applied after the glazing has been sprayed upon the face of a tile and is dried but before the glazing is fired. The gauge is moved across the face of a tile so that the supports scratch away the glazing and rest upon the face of the tile. If the glazing is of the proper thickness the portion 17 will slightly scratch the top of the glazing. The portion 16 will not touch the top of the glazing. If the portion 17 fails to touch the glazing so as to scratch it, then the glazing is too thin; if the glazing is thick enough to be scratched by the portion 16 then it is too thick. The steel support strips 11 may be very thin, for example, in the neighborhood of .001 of an inch in thickness. By constant use this thin material wears in at the ends where it rests upon the abrasive surface of the tile. In actual use these strips will break when worn about half through. This insures that the gauge will be accurate within one-half thousandth of an inch which is sufficiently accurate. When the strips 11 are worn in two they are removed and new strips inserted. Removing and replacing them with new strips is a very simple operation and may be performed much more quickly than grinding the ends of legs on a gauge, moreover this insures accuracy within a predetermined tolerance.

It will be obvious to those skilled in the art that various changes may be made in my device without departing from the spirit of the invention and therefore I do not limit myself to what is shown in the drawing and described in the specification, but only as indicated in the appended claims.

Having thus fully described my said invention, what I claim as new and desire to secure by Letters Patent, is:

1. A thickness gauge for glazing comprising a block having end supports and having intermediate fingers, one of said intermediate fingers being adapted to engage the surface of the glazing to be measured to scratch it if thick enough and the other of which terminates a distance above the surface to indicate the maximum thickness of the glazing, substantially as set forth.

2. A gauge of the kind described comprising a block having supports provided with removable wear surfaces adapted to rest upon the face of a tile having glazing thereon, a pair of intermediate fingers depending from said block, said fingers being of different length, the distance in length between the long finger and the supports of the block determining the thickness of the glazing on a tile and the difference between the length of the short finger and said supports indicating the maximum thickness permissible in the glazing to be measured, substantially as set forth.

3. A device for gauging the thickness of a film on a plane surface comprising a block having supports adapted to rest upon the face of a surface upon which the film is deposited, and a pair of fingers of different lengths intermediate said supports, the longest one of which is adapted to contact with the surface of a film of correct thickness and the shortest of which terminates a short distance above the surface of such a film, the difference in the length of the two fingers determining the range permissible in the thickness of the film to be gauged, substantially as set forth.

4. A device for gauging the thickness of a film on a plane surface comprising a block having a row of depending fingers the end ones of which form supports adapted to rest upon the face of a surface upon which the film is deposited and the intermediate fingers being of different lengths, the longest one of which is adapted to contact with the surface of a film of correct thickness and the shortest one of which terminates a short distance above the surface of such a film, the difference in the length of the two fingers determining the range permissible in the thickness of the film to be gauged, the supporting fingers being faced with a removable strip of thin material removably attached to the block, the thickness of said facing material representing substantially double the degree of accuracy with which the device gauges said film, substantially as set forth.

In witness whereof, I have hereunto set my hand at Anderson, Indiana, this twenty-fifth day of May, A. D. nineteen hundred and thirty-one.

JAMES ARTHUR BOWER.